(12) United States Patent
Chopade et al.

(10) Patent No.: US 10,577,536 B2
(45) Date of Patent: Mar. 3, 2020

(54) VERTICAL PROPPANT SUSPENSION IN HYDRAULIC FRACTURES

(71) Applicant: Halliburton Energy Services, Inc., Houston, TX (US)

(72) Inventors: Prashant D. Chopade, Kingwood, TX (US); Dipti Singh, Kingwood, TX (US); Travis Hope Larsen, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/577,513

(22) PCT Filed: Jun. 30, 2015

(86) PCT No.: PCT/US2015/038628
§ 371 (c)(1),
(2) Date: Nov. 28, 2017

(87) PCT Pub. No.: WO2017/003464
PCT Pub. Date: Jan. 5, 2017

(65) Prior Publication Data
US 2018/0134948 A1 May 17, 2018

(51) Int. Cl.
*E21B 43/267* (2006.01)
*C09K 8/80* (2006.01)
*C09K 8/60* (2006.01)

(52) U.S. Cl.
CPC .............. *C09K 8/805* (2013.01); *C09K 8/601* (2013.01); *C09K 8/80* (2013.01); *E21B 43/267* (2013.01);
(Continued)

(58) Field of Classification Search
None
See application file for complete search history.

(56) References Cited

U.S. PATENT DOCUMENTS

| 3,757,864 A * | 9/1973 | Crawford | C07F 9/02 137/13 |
| 4,443,347 A * | 4/1984 | Underdown | C09K 8/62 166/280.2 |

(Continued)

OTHER PUBLICATIONS

International Search Report and Written Opinion for Application No. PCT/US2015/038628 dated Sep. 30, 2015.

*Primary Examiner* — William D Hutton, Jr.
*Assistant Examiner* — Charles R Nold
(74) *Attorney, Agent, or Firm* — Thomas Rooney; C. Tumey Law Group PLLC

(57) ABSTRACT

A method of treating in a subterranean formation including combining an aqueous base fluid, an oil based fluid, a hydrophobic proppant, and a non-hydrophobic proppant to form an immiscible fluid system; and introducing the immiscible fluid system into the subterranean formation. A method of treating includes combining an aqueous base fluid, an oil based fluid, a hydrophobic proppant, and a non-hydrophobic proppant to form an immiscible fluid system; introducing the immiscible fluid system into a fracture in the formation; allowing the immiscible fluid system to separate into at least two separate phases, wherein the oil based fluid and hydrophobic proppant to form proppant aggregates and the aqueous based fluid to act as a spacer fluid surrounding at least a portion of the proppant aggregates; and removing the spacer fluid from the fracture during flowback stage or well production to form proppant-free channels between proppant aggregates.

10 Claims, 4 Drawing Sheets

(52) U.S. Cl.
CPC ...... *C09K 2208/04* (2013.01); *C09K 2208/10* (2013.01); *C09K 2208/30* (2013.01)

(56) References Cited

U.S. PATENT DOCUMENTS

| | | |
|---|---|---|
| 6,742,590 B1 | 6/2004 | Nguyen et al. |
| 6,892,813 B2 | 5/2005 | Nguyen et al. |
| 7,128,158 B2 | 10/2006 | Nguyen et al. |
| 7,255,168 B2 | 8/2007 | Nguyen et al. |
| 7,281,580 B2 | 10/2007 | Parker et al. |
| 7,281,581 B2 | 10/2007 | Nguyen et al. |
| 7,581,590 B2 | 9/2009 | Lesko et al. |
| 7,918,277 B2 | 4/2011 | Brannon et al. |
| 8,088,718 B2 | 1/2012 | Bicerano et al. |
| 8,109,336 B2 | 2/2012 | Wheeler et al. |
| 8,127,850 B2 | 3/2012 | Brannon et al. |
| 8,584,755 B2 | 11/2013 | Willberg et al. |
| 8,727,003 B2 | 5/2014 | Li et al. |
| 9,702,239 B2 | 7/2017 | Russell et al. |
| 9,725,638 B2 | 8/2017 | Alwattari et al. |
| 2008/0280788 A1* | 11/2008 | Parris ............... C09K 8/685 507/211 |
| 2012/0181033 A1* | 7/2012 | Saini ............... C09K 8/265 166/308.1 |
| 2013/0161003 A1* | 6/2013 | Makarychev-Mikhailov .............. C09K 8/685 166/280.1 |
| 2013/0292118 A1* | 11/2013 | Nguyen ............... C09K 8/62 166/280.1 |
| 2014/0000891 A1* | 1/2014 | Mahoney ............... C09K 8/805 166/280.2 |
| 2014/0138085 A1 | 5/2014 | Lesko et al. |
| 2014/0228258 A1 | 8/2014 | Mahoney et al. |
| 2014/0251611 A1 | 9/2014 | Vo et al. |
| 2014/0367100 A1 | 12/2014 | Oliveira et al. |
| 2015/0322335 A1* | 11/2015 | Lawrence ............ E21B 43/267 166/280.2 |
| 2016/0017213 A1* | 1/2016 | Zhang ............... C09K 8/80 507/202 |
| 2016/0122625 A1 | 5/2016 | Singh et al. |
| 2016/0137908 A1 | 5/2016 | Alwattari et al. |
| 2016/0230526 A1* | 8/2016 | Crews ................ E21B 43/17 |
| 2016/0304646 A1* | 10/2016 | Hsu ................ C08F 220/18 |
| 2016/0333258 A1* | 11/2016 | Drake ................ C09K 8/805 |
| 2016/0340575 A1 | 11/2016 | Nguyen et al. |
| 2017/0145294 A1 | 5/2017 | Chopade et al. |

* cited by examiner

VERTICAL PROPPANT SUSPENSION IN HYDRAULIC FRACTURES

BACKGROUND

The present invention generally relates to the use of proppants in subterranean operations, and, more specifically, to immiscible fluid systems, and methods of using these immiscible fluid systems in subterranean operations.

Subterranean wells (e.g., hydrocarbon fluid producing wells and water producing wells) are often stimulated by hydraulic fracturing treatments. In a typical hydraulic fracturing treatment, a treatment fluid is pumped into a wellbore in a subterranean formation at a rate and pressure above the fracture gradient of the particular subterranean formation so as to create or enhance at least one fracture therein. Particulate solids (e.g., graded sand, bauxite, ceramic, nut hulls, and the like), or "proppant particulates," are typically suspended in the treatment fluid or a second treatment fluid and deposited into the fractures while maintaining pressure above the fracture gradient. The proppant particulates are generally deposited in the fracture in a concentration sufficient to form a tight pack of proppant particulates, or "proppant pack," which serves to prevent the fracture from fully closing once the hydraulic pressure is removed. By keeping the fracture from fully closing, the interstitial spaces between individual proppant particulates in the proppant pack form conductive pathways through which produced fluids may flow.

In traditional hydraulic fracturing treatments, the specific gravity of the proppant particulates may be high in relation to the treatment fluids in which they are suspended for transport and deposit in a target interval (e.g., a fracture). Therefore, the proppant particulates may settle out of the treatment fluid and fail to reach the target interval. For example, where the proppant particulates are to be deposited into a fracture, the proppant particulates may settle out of the treatment fluid and accumulate only or substantially at the bottommost portion of the fracture, which may result in complete or partial occlusion of the portion of the fracture where no proppant particulates have collected (e.g., at the top of the fracture). As such, fracture conductivity and production over the life of a subterranean well may be substantially impaired if proppant particulates settle out of the treatment fluid before reaching their target interval within a subterranean formation.

One way to compensate for proppant particulate settling is to introduce the proppant particulates into the fracture in a viscous gelled fluid. Gelled fluids typically require high concentrations of gelling agents and/or crosslinker, particularly when transporting high concentrations of proppant particulates in order to maintain them in suspension. As many gelling and crosslinking agents are used in a variety of fluids within and outside of the oil and gas industry, their demand is increasing while their supply is decreasing. Therefore, the cost of gelling and crosslinking agents is increasing, and consequently, the cost of hydraulic fracturing treatments requiring them is also increasing. Additionally, the use of gelling and crosslinking agents may result in premature viscosity increases that may cause pumpability issues or problems with subterranean operations equipment.

Prior attempts aimed at preventing proppant settling in a vertical fracture have focused on creating proppant with density less than or equal to that of the carrier fluid. The methods of creating neutrally buoyant proppant includes surface-sealing of porous ceramic particles to trap air-filled voids inside the particles, creating composites of strong materials and hollow ceramic spheres, and creating hollow spheres with sufficient wall strength to withstand closure stresses. Polymer composite has also been used to make lightweight proppant. These approaches have characteristic drawbacks in terms of proppant durability and cost to manufacture.

The degree of success of a hydraulic fracturing operation depends, at least in part, upon fracture conductivity after the fracturing operation has ceased and production commenced, creating the need for products and methods that hinder the settling of proppant particulates in a treatment fluid.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figures 1A, 1B, 1C:
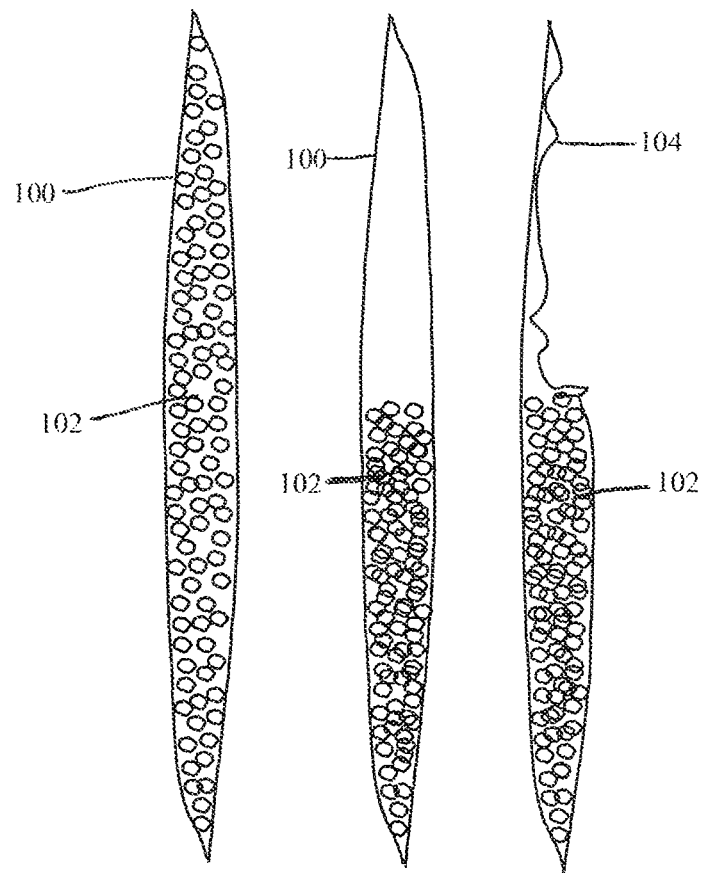
FIGS. 1A-C depict the problems with proppants suspension stages in vertical fractures.

Embodiments of the invention are directed to immiscible fluid systems including an aqueous base fluid and an oil based fluid used in providing a method for improved vertical proppant suspension. Proppant transport inside a hydraulic fracture has two components when the fracture is being generated. The horizontal component is dictated by the fluid velocity and associated streamlines which help carry proppant to the tip of the fracture. The vertical component is governed by the particle settling velocity of the proppant and is a function of proppant diameter and density as well as fluid viscosity and density. FIGS. 1A-C demonstrate the various proppant suspension stages in vertical fracture. FIG. 1A depicts a fracture 100 after the completion of pumping proppant slurry 102. FIG. 1B shows the vertical distribution of the proppant slurry 102 in fracture 100 during shut-in time, followed by FIG. 1C, illustrating proppant slurry 102 in closed fracture 104.

Figures 2A, 2B:
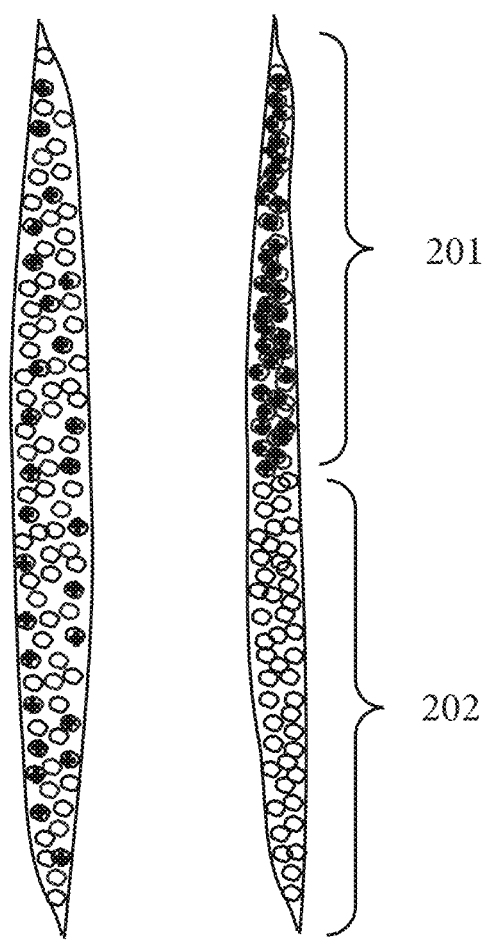
FIGS. 2A-B depict proppant suspension stages in a vertical fractures utilizing the immiscible fluid systems of the disclosure.

The immiscible fluid system of this disclosure is demonstrated in FIGS. 2A and 2B. As illustrated in FIG. 2A, the fracture was loaded with non-hydrophobic proppants and hydrophobic proppants. FIG. 2B shows that after the pumping operation is complete this fluid system will separate into two separate phases, with the hydrophobic proppant 201 remaining in the oil based fluid, and the non-hydrophobic proppant 202 settling at the bottom of the fracture. Improved vertical proppant suspension may lead to improved conductivity and increase in hydrocarbon production.

In certain embodiments of the present invention, a method of treating in a subterranean formation comprises: combining an aqueous base fluid, an oil based fluid, a hydrophobic proppant, and a non-hydrophobic proppant to form an immiscible fluid system; and introducing the immiscible fluid system into the subterranean formation. In some embodiments, the aqueous base fluid comprises at least one fluid selected from aqueous linear gel, aqueous linear polysaccharide gel, crosslinked aqueous base fluid, slick water, water, brine, viscoelastic surfactant solution, and combinations thereof. In exemplary embodiments, the aqueous base fluid comprises aqueous linear gaur gel. In other embodiments, the oil based fluid comprises at least one fluid selected from crosslinked oil based gel, non-crosslinked oil based gel, oil based surfactant gel, crosslinked anionic surfactant oil based gel, food grade oils, and combinations thereof. In an embodiment, the oil based fluid comprises crosslinked anionic surfactant oil based gel. In some embodiments, the hydrophobic proppant comprises at least one selected from a hydrophobically modified proppant, an inherently hydrophobic proppant, a proppant with a hydrophobic coating, and combinations thereof. In certain embodiments, the hydrophobically modified proppant includes at least one of a hydrophobically modified amine-containing polymer (HMAP), a silane composition, and combinations thereof, the HMAP comprising a plurality of hydrophobic modifications on an amine-containing polymer, wherein the amine-containing polymer comprises at least one selected from the group consisting of a polyamine, a polyimine, a polyamide, poly(2-(N,N-dimethylamino)ethyl methacrylate), poly(2-(N,N-diethylamino)ethyl methacrylate), poly(vinyl imidazole), any copolymer thereof, and any combination thereof, and wherein the hydrophobic modification comprises a $C_4$-$C_{30}$ moiety comprising at least one feature selected from the group consisting of straight chain, branched chain, unsaturated C—C bond, aryl group, and any combination thereof. The silane composition may be selected from the group consisting of 1,8 bis(triethoxy silyl octane), octadecyltrichlorosilane, butyldimethylchlorosilane, heptadecafluorodecyltrimethoxysilane, 1,2-bis(triethoxysilyl)ethane, hexaethoxydisilethylene, bis(trimethoxysilylethyl) benzene, 1,2-bis(trimethoxysilyl)decane, and combinations thereof. In some embodiments, the non-hydrophobic proppants are at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. In other embodiments, the subterranean formation comprises at least one fracture and wherein the introducing further comprises placing at least a portion of the immiscible fluid system into the at least one fracture. In yet another embodiment, the method further comprises adding a consolidating agent to the immiscible fluid system at a time of at least one of before the introducing of the immiscible fluid system into the subterranean formation, during the introducing of the fluid system, after the introducing the fluid system, and combinations thereof. In some embodiments, the hydrophobic proppant comprises a proppant that has been at least one of hydrophobically modified, hydrophobically coated, and combinations thereof.

Some embodiments of the present invention provide a method of treating in a subterranean formation comprising: a) combining an aqueous base fluid, an oil based fluid, a hydrophobic proppant, and a non-hydrophobic proppant to form an immiscible fluid system; b) introducing the immiscible fluid system into a portion of the at least one fracture in the formation; c) allowing the oil based fluid and hydrophobic proppant to form proppant aggregates, and the aqueous based fluid to act as a spacer fluid surrounding at least a portion of the proppant aggregates; d) repeating any sequence of b) and c) until a desired amount of proppant aggregates have been formed in the fracture; and e) removing the spacer fluid from the fracture during flowback stage or well production to form proppant-free channels between proppant aggregates. The oil based fluid with the hydrophobic proppant, and the aqueous base fluid with the non-hydrophobic proppant may be introduced into the formation as at least one of an emulsion, distinct phases, and combinations thereof. In some embodiments, the aqueous base fluid comprises at least one fluid selected from aqueous linear gel, aqueous linear polysaccharide gel, crosslinked aqueous base fluid, slick water, water, brine, viscoelastic surfactant solution, and combinations thereof. In exemplary embodiments, the aqueous base fluid comprises aqueous linear gaur gel. In other embodiments, the oil based fluid comprises at least one fluid selected from crosslinked oil based gel, non-crosslinked oil based gel, oil based surfactant gel, crosslinked anionic surfactant oil based gel, food-grade oils, and combinations thereof. In an embodiment, the oil based fluid comprises crosslinked anionic surfactant oil based gel. In some embodiments, the hydrophobic proppant comprises at least one selected from a hydrophobically modified proppant, an inherently hydrophobic proppant, a proppant with a hydrophobic coating, and combinations thereof. In certain embodiments, the hydrophobically modified proppant includes at least one of a hydrophobically modified amine-containing polymer (HMAP), a silane composition, and combinations thereof; the HMAP comprising a plurality of hydrophobic modifications on an amine-containing polymer, wherein the amine-containing polymer comprises at least one selected from the group consisting of a polyamine, a polyimine, a polyamide, poly(2-(N,N-dimethylamino)ethyl methacrylate), poly(2-(N,N-diethylamino)ethyl methacrylate), poly(vinyl imidazole), any copolymer thereof, and any combination thereof and wherein the hydrophobic modification comprises a $C_4$-$C_{30}$ moiety comprising at least one feature selected from the group consisting of straight chain, branched chain, unsaturated C—C bond, aryl group, and any combination thereof.

The silane composition may be selected from the group consisting of 1,8 bis(triethoxy silyl) octan), octadecyltrichlorosilane, butyldimethylchlorosilane, heptadecafluorodecyltrimethoxysilane, 1,2-bis(triethoxysilyl)ethane, hexaethoxydisilethylene, bis(trimethoxysilylethyl) benzene, 1,2-bis(trimethoxysilyl)decane, and combinations thereof.

In some embodiments, the non-hydrophobic proppants are at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. In yet another embodiment, the method further comprises adding a consolidating agent to the immiscible fluid system at a time of at least one of before the introducing of the immiscible fluid system into the subterranean formation, during the introducing of the fluid system, after the introducing the fluid system, and combinations thereof.

Another embodiment of the invention is directed to a method of treating in a subterranean formation comprising: combining a non-aqueous carrier fluid; a nanoparticle slurry including a microparticle suspension comprising a first proppant; an aqueous base fluid; and a second proppant; to form an immiscible fluid system, wherein the first proppant is hydrophobic and the second proppant is non-hydrophobic, and the nanoparticle slurry comprises at least one of polymer particles, surfactants, clay, metal oxides, graphene, and combinations thereof acting as suspension agents; and introducing the immiscible fluid system into the subterranean formation. The microparticle may be coated with a hydrophobic coating. In an embodiment, the first proppant is of the same composition as the second proppant except for the addition of a hydrophobic coating to the first proppant.

In an exemplary embodiment, a well treatment system comprises: a well treatment apparatus, including a mixer and a pump, configured to: combine an aqueous base fluid, an oil based fluid, a hydrophobic proppant, and a non-hydrophobic proppant to form an immiscible fluid system; and introduce the immiscible fluid system into a subterranean formation.

In one embodiment, the immiscible fluid system described herein provides an effective means for forming propped fractures containing proppant-free channels. The solid-laden oil based gel is used to form proppant aggregates that remain in suspension in the propped fracture and act as pillars to support the fracture from complete closure. The aqueous-based linear guar gel acts as spacer fluid to surround the proppant aggregates. After the closure of fracture, the guar gel is removed with the production fluid, thus forming channels surrounding the proppant aggregates, connecting the propped fracture with the wellbore. This fluid system may provide an effective way to ensure that proppant aggregates remain in suspension even with a long closure time (i.e., several hours in some cases in certain reservoirs), to greatly enhance their vertical distribution in the propped fracture, and thus maintain the high conductivity of proppant-free channels as designed.

Aqueous Base Fluids

The aqueous base fluid of the present embodiments can generally be from any source, provided that the fluids do not contain components that might adversely affect the stability and/or performance of the treatment fluids of the present invention. The proppant typically has a much higher density than water. For example, sand has a specific gravity of about 2.7. Any such proppant suspended in the water will tend to separate quickly and settle out from the water very rapidly. To help suspend the proppant in a water-based fracturing fluid, it is common to use a viscosity-increasing agent for the purpose of increasing the viscosity of water. The viscosity-increasing agent is sometimes known in the art as a "thickener."

A viscosity-increasing agent is a chemical additive that alters fluid rheological properties to increase the viscosity of the fluid. A viscosity-increasing agent can be used to increase the viscosity, which increased viscosity can be used, for example, to help suspend a proppant material in the treatment fluid.

Because of the high volume of fracturing fluid typically used in fracturing, it is desirable to increase the viscosity of fracturing fluids efficiently in proportion to the concentration of the viscosity-increasing agent. Being able to use only a small concentration of the viscosity-increasing agent requires less total amount of the viscosity-increasing agent to achieve the desired fluid viscosity in a large volume of fracturing fluid. Efficient and inexpensive viscosity-increasing agents include water-soluble polymers such as guar gum. Other types of viscosity-increasing agents, such as viscoelastic surfactants, can also be used for various reasons, for example, in high-temperature applications.

The viscosity of a solution of a given concentration of guar gum or other viscosity-increasing agent can be greatly enhanced by cross-linking the viscosity-increasing agent. One example of a cross-linking agent is boric acid. A cross-linking agent can help increase the viscosity of a fluid for a given concentration of a viscosity-increasing agent. A "base gel" is a fluid that includes a viscosity-increasing agent, such as guar, but that excludes, for example, fluids that are typically referred to as "cross-linked gels" and "surfactant gels."

In the aqueous based fluid embodiments, a variety of gelling agents may be used, including hydratable polymers that contain one or more functional groups such as hydroxyl, carboxyl, sulfate, sulfonate, amino, or amide groups. Suitable gelling agents typically comprise natural polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucose, xylose, arabinose, fructose, glucuronic acid, or pyranosyl sulfate. Examples of suitable polymers include, but are not limited to, xanthan, guar, guar derivatives (such as hydroxypropyl guar, carboxymethyl guar, and carboxymethylhydroxypropyl guar), and cellulose derivatives (such as hydroxyethyl cellulose and carboxylmethyl hydroxy ethyl cellulose). Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone.

The aqueous base fluid may include aqueous linear gels, aqueous linear polysaccharide gels, aqueous linear guar gels, crosslinked aqueous base fluids, slick water, water, brine, viscoelastic surfactant solution, and combinations thereof. In a preferred embodiment, the aqueous base fluid comprises aqueous linear gaur gel.

Commercially available aqueous gels include, but are not limited to, Delta Frac™ Fracturing Fluid, a borate fracturing fluid; DeepQuest™ Stimulation Fluid, a weighted stimulation fluid; Hybor™ fluid, a delayed borate-crosslinked fluid using guar or hydroxypropyl gar gelling agent; Omega-Frac™ fluid system; pHaserFrac℠ Service fracturing fluid; Pur-Gel™III fracturing fluid; SeaQuests℠ Service fracturing fluid; Sirocco℠ Fracturing Service fluid; SilverStim™ UR and LT fracturing fluid; Thermagel™ fluid; Versagel™ HT and LT System fluid, all of which are available from Halliburton Energy Services, Houston, Tex.

In various embodiments, the aqueous base fluid can comprise fresh water, salt water, seawater, brine, or an aqueous salt solution. In some embodiments, the aqueous base fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In some embodiments, the aqueous base fluid is present in the immiscible fluid system in the amount of from about 20% to about 99% by volume of the fluid system.

Oil Based Fluid

An oil based fluid is a component of the immiscible fluid system. Any oil-based fracturing fluid known in the art that is compatible with the hydrophobic proppant may be used in the methods of the present invention. Suitable oil based fluids may include alkanes, olefins, aromatic organic compounds, cyclic alkanes, paraffins, diesel fluids, mineral oils, desulfurized hydrogenated kerosenes, and any combination thereof. Some commonly known oil-based fracturing fluids include hydrocarbon liquids gelled with gelling agents that comprise a metal salt of a phosphoric acid ester. Other known oil-based gelling agents include metal salts of phosphonic acid esters such as those described in U.S. Pat. No. 6,511,944 as issued on Jan. 28, 2003.

The oil based fluid may include at least one fluid selected from crosslinked oil based gel, non-crosslinked oil based gel, oil based surfactant gel, crosslinked anionic surfactant oil based gel, food-grade oils, and combinations thereof. In a preferred embodiment, the oil based fluid comprises crosslinked anionic surfactant oil based gel. Food-grade oils may include, but are not limited to, vegetable oil, corn oil, canola oil, and combinations thereof. One commercially available crosslinked anionic surfactant oil based gel is My-T-Oil™ gel, available from Halliburton Energy Services, Houston, Tex. Other commercially available oil based fluids include Vis-O-Frac™ fluid; V-O-Gel™ fluid; My-T-Oil™ I, II, III, IV, V; fluid, MISCO2 Frac™ Service; all of which are available from Halliburton Energy Services, Houston, Tex.

For the compositions using non-crosslinked oils, the viscosity of non-aqueous phase may be increased without using a crosslinker by including a gelling agent for the non-aqueous phase. This gelling agent may include hydrophobic polymers such as ethyl cellulose, cellulose acetate trimellitate, hydroxypropyl methylcellulose, cellulose derivatives, acrylic and/or methacrylic ester polymers, polymers or copolymers of acrylate or methacrylate polyvinyl esters, starch derivatives, polyvinyl acetates, polyacrylic acid esters, phtalate, zein, starch acetate, and combinations thereof. Polymer-surfactant combinations can also be used to increase the viscosity for the non-aqueous phase.

In some embodiments, the oil based fluid is present in the immiscible fluid system in the amount of from about 0.1% to about 60% by volume of the fluid system. In another embodiment, the oil based fluid is present in the immiscible fluid system in the amount of from about 0.1% to about 20% by volume of the fluid system Proppants One component of the immiscible fluid systems of the disclosure include non-hydrophobic proppants. In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the treatment fluids.

Hydrophobic Proppants

The hydrophobic proppants of the present invention may be a hydrophobically modified proppant, an inherently hydrophobic proppant, a proppant with a hydrophobic coating, and combinations thereof. One example of a hydrophobically modified proppant is a proppant including a "hydrophobically modified amine-containing polymer" (or "HMAP"). HMAP is used herein to describe amine-containing polymers (i.e., polymers with an amine in the polymer backbone, polymer branch, or in both the backbone and branches) that have been hydrophobically modified. Generally, the HMAP, like traditional tackifiers, is nonhardening but is less sticky to the touch than traditional tackifiers while still being effective at agglomerating particulates. The hydrophobic proppant comprises a proppant that has been at least one of hydrophobically modified, hydrophobically coated, and combinations thereof.

The HMAP described herein are amine-containing polymers that have been hydrophobically modifid. Examples of amine-containing polymers may include, but are not limited to, polyamines (e.g., sperrnidine and spermine), polyimines (e.g., poly(ethylene imine) and poly(propylene imine)), polyamides, poly(2-(N,N-dimethylamino)ethyl methacrylate), poly(2-(N,N-diethylamino) ethyl methacrylate), poly(vinyl imidazole), and the like, any copolymer thereof, and any combination thereof. Further, amine-containing polymers may include a copolymer of at least one of the foregoing amine-containing polymers (or corresponding monomer unit) and at least one polymer (or corresponding monomer unit) that does not contain an amine (e.g., polyethylene, polypropylene, polyethylene oxide, polypropylene oxide, polyvinylpyridine, polyacrylic acid, polyacrylate, polymethacrylate, and the like).

In some embodiments, the hydrophobically modified proppant includes a at least one of hydrophobically modified amine-containing polymer (HMAP), a silane composition, and combinations thereof, the HMAP comprising a plurality of hydrophobic modifications on an amine-containing polymer, wherein the amine-containing polymer comprises at least one selected from the group consisting of a polyamine, a polyimine, a polyamide, poly(2-(N,N-dimethylamino) ethyl methacrylate), poly(2-(N,N-diethylamino)ethyl methacrylate), poly(vinyl imidazole), any copolymer thereof, and any combination thereof; and wherein the hydrophobic modification comprises a $C_4$-$C_{30}$ moiety comprising at least one feature selected from the group consisting of straight chain, branched chain, unsaturated C—C bond, aryl group, and any combination thereof.

The silane composition may be selected from the group consisting of 1,8 bis(triethoxy silyl octane), octadecyltrichlorosilane, butyldimethylchlorosilane, heptadecafluorodecyltrimethoxysilane, 1,2-bis(triethoxysilyl)ethane, hexaethoxydisilethylene, bis(trimethoxysilylethyl) benzene, 1,2-bis(trimethoxysilyl)decane, and combinations thereof.

An example of an inherently hydrophobic proppant is one made directly out of a hydrophobic material, such as polytetrafluoroethylene. This polymer may also be used to coat proppants to make them hydrophobic in nature.

Coated Proppants

As used herein, the term "coating," and the like, does not imply any particular degree of coating on a particulate. In particular, the terms "coat" or "coating" do not imply 100% coverage by the coating on a particulate. It should be understood that the term "particulate," as used in this disclosure, includes all known shapes of materials, including substantially spherical materials, fibrous materials, polygonal materials (such as cubic materials), and combinations thereof.

The proppant coating may be applied by many techniques. In one embodiment, the polymer is applied by solution coating. In this process a polymer solution is prepared by mixing polymer into a solvent until a homogenous mixture is achieved. Proppant is added to solution, and the solvent is removed under vacuum using a rotary evaporator. The remaining proppant is adsorbed to proppant surface.

In another embodiment, a dry coating technique is used. An adhesion promoter (e.g., functionalized trimethoxysilanes) is added to dry proppant. The solution is mixed by hand, in a speed mixer, or extruder to evenly coat proppant. Liquid polymer is then added to the proppant and mixed until a homogenous coating has developed.

In an embodiment, a spray coating technique is used. Liquid polymer (or polymer solution) is sprayed onto the proppant substrate. The coated proppant is then dried to remove water or carrier fluids.

In yet another embodiment, a surface polymerization technique is used. Precursor monomers are grafted onto a proppant substrate. The proppant is then suspended in a monomer solution and polymerization is initiated. Polymers grow directly from the proppant surface.

In various embodiments, the amount of coating on the proppants is about 0.1 wt. % to about 10 wt. % of the proppant substrate. In another embodiment, the amount of coating is the amount needed to produce a hydrophobic proppant particle.

Consolidating Agents

The consolidating agents used in the compositions and methods of the present invention generally comprise any compound that is capable of minimizing particulate migration and/or modifying the stress-activated reactivity of subterranean fracture faces and other surfaces in subterranean formations.

The consolidating agent may comprise compounds such as tackifying agents, resins, and combinations thereof. The consolidating agents may be present in the immiscible fluid system in an amount in the range from about 0.01% to 30% by weight of the composition. The type and amount of consolidating agent included in a particular composition or method of the invention may depend upon, among other factors, the temperature of the subterranean formation, the chemical composition of formations fluids, flow rate of fluids present in the formation, and the like. It is within the ability of one skilled in the art, with the benefit of this disclosure, to determine the type and amount of consolidating agent to include in the immiscible fluid systems of the present invention to achieve the desired results.

In some embodiments, the consolidating agent may comprise a tackifying agent. A particularly preferred group of tackifying agents comprises polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying agents include liquids and solutions of, for example, polyesters, polycarbonates and polycarbamates, natural resins such as shellac and the like.

In some embodiments, the consolidating agent may comprise a resin. The term "resin" as used herein refers to any of numerous physically similar polymerized synthetics or chemically modified natural resins including thermoplastic materials and thermosetting materials. Resins suitable for use in the present disclosure include all resins known and used in the art. One type of resin coating material suitable for use in the compositions and methods of the present disclosure is a two-component epoxy based resin comprising a liquid hardenable resin component and a liquid hardening agent component. The liquid hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well, the surrounding weather conditions, and the desired long-term stability of the consolidating agent emulsion. An alternate way to reduce the viscosity of the hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, among other things, breaking gelled fracturing fluid films on the proppant particulates, and an optional liquid carrier fluid for, among other things, reducing the viscosity of the hardening agent component.

Examples of hardenable resins that can be used in the liquid hardenable resin component include, but are not limited to, organic resins such as bisphenol A diglycidyl ether resin, butoxymethyl butyl glycidyl ether resin, bisphenol A-epichlorohydrin resin, bisphenol F resin, polyepoxide resin, novolak resin, polyester resin, phenol-aldehyde resin, urea-aldehyde resin, furan resin, urethane resin, a glycidyl ether resin, other similar epoxide resins and combinations thereof. The hardenable resin used is included in the liquid hardenable resin component in an amount in the range of from about 5% to about 100% by weight of the liquid hardenable resin component. In some embodiments the hardenable resin used is included in the liquid hardenable resin component in an amount of about 25% to about 55% by weight of the liquid hardenable resin component. It is within the ability of one skilled in the art with the benefit of this disclosure to determine how much of the liquid hardenable resin component may be needed to achieve the desired results. Factors that may affect this decision include which type of liquid hardenable resin component and liquid hardening agent component are used.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

Methods of Use

A method of treating a fracture in a subterranean formation may include combining an aqueous base fluid, an oil based fluid, a hydrophobic proppant, and a non-hydrophobic proppant to form an immiscible fluid system; and pumping the immiscible fluid system into the subterranean formation. After the pumping operation is complete, the fluid system is allowed to separate into at least two separate phases. The heavy non-hydrophobic proppant will settle to the bottom of a fracture and the hydrophobic proppant will remain suspended in the oil based fluid.

Another method of treating a fracture in a subterranean formation includes a) combining an aqueous base fluid, an oil based fluid, a hydrophobic proppant, and a non-hydrophobic proppant to form an immiscible fluid system; b) introducing the immiscible fluid system into a portion of the at least one fracture in the formation; c) allowing the immiscible fluid system to separate into at least two separate phases, wherein the oil based fluid and hydrophobic proppant form proppant aggregates, and the aqueous based fluid acts as a spacer fluid surrounding at least a portion of the proppant aggregates; and d) repeating any sequence of b) and c) until a desired amount of proppant aggregates have been formed in the fracture. The solid-laden oil based fluid is used to form proppant aggregates that remain in suspension in the propped fracture and act as pillars to support the fracture from complete closure. The aqueous based fluid acts as spacer fluid to surround the proppant aggregates. After the closure of fracture, the aqueous based fluid is removed with the production fluid, thus forming channels surrounding the proppant aggregates, connecting the propped fracture with the wellbore.

In a further method, an immiscible fluid system can carry non-aqueous base fluid with a nanoparticle slurry including a microparticle suspension, and an aqueous fluid system containing higher density proppant to support vertical distribution. The nanoparticle slurry comprises polymer particles, surfactants, or clay to aid suspension of the low density proppant.

In another method, the microparticle proppant can be coated with hydrophobic coatings to improve suspension in the nano-particle slurry and create two immiscible proppant packs to achieve vertical proppant distribution.

The treatment fluids of the present invention may be prepared by any method suitable for a given application. For example, certain components of the treatment fluid of the present invention may be provided in a pre-blended powder or a dispersion of powder in a nonaqueous liquid, which may be combined with the aqueous base fluid at a subsequent time. After the preblended liquids and the aqueous base fluid have been combined polymerization initiators and other suitable additives may be added prior to introduction into the wellbore. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a subterranean formation can include introducing at least into and/or through a wellbore in the subterranean formation. According to various techniques known in the art, equipment, tools, or well fluids can be directed from a wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the polymerizable aqueous consolidation compositions and/or the water-soluble polymerization initiator compositions, and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 3:
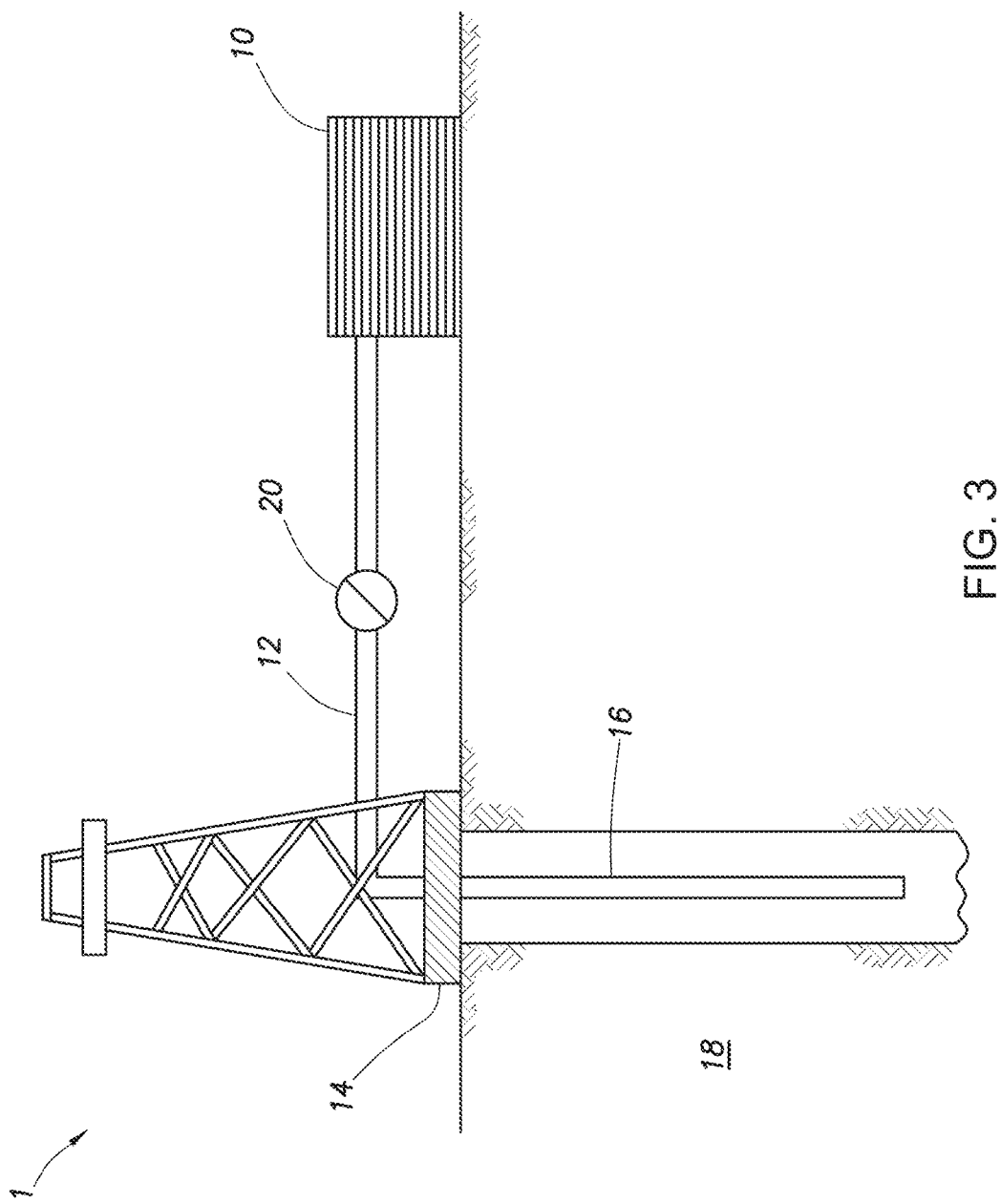
FIG. 3 depicts an embodiment of a system configured for delivering the immiscible fluid systems of the embodiments described herein to a downhole location.

FIG. 3 shows an illustrative schematic of a system that can deliver treatment fluids of the embodiments disclosed herein to a downhole location, according to one or more embodiments. It should be noted that while FIG. 3 generally depicts a land-based system, it is to be recognized that like systems may be operated in subsea locations as well. As depicted in FIG. 3, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Experimental Procedure:

1. My-T-Oil™ gel preparation: To 100 ml of the LCA-1™ solvent system added 4 gal/1000 gal MO-85M™ agent and 4 gal/1000 gal MO-86M™ agent (crosslinker).

2. Linear guar gel preparation: 10 lb/1000 gal WG-36™ gelling agent (native guar polymer) is hydrated for 30 minutes.

3. Hydrophobically modified proppant preparation: 5 gm microproppant was dry coated with 0.5 ml of FinesWedge™ Conductivity Enhancer.

4. The hydrophobically modified proppant was added to 50 ml of My-T-Oil gel and mixed properly on a blender. To this solution, 50 ml linear guar gel solution and 10 gm of SSA-2 were added.

5. In a blender, My-T-Oil gel containing hydrophobically modified proppant was mixed with linear guar gel containing SSA-2.

LCA-1™ solvent system is a paraffinic fracturing solvent, available from Halliburton Energy Services, Houston, Tex. $WG_{36}$™ gelling agent is a native guar polymer available from Halliburton Energy Services. MO-85M™ is a commercially available phosphate ester, available from Halliburton Energy Services. MO-86M™ is an iron III crosslinker, available from Halliburton Energy Services. FinesWedge™ Conductivity Enhancer is a hydrophobic polymer system available from Halliburton Energy Services. My-T-Oil™ gel is an anionic surfactant oil based gel system, available from Halliburton Energy Services. SSA-2™ additive is course silica flour from Oklahoma #1 dry sand.

Figure 4A:
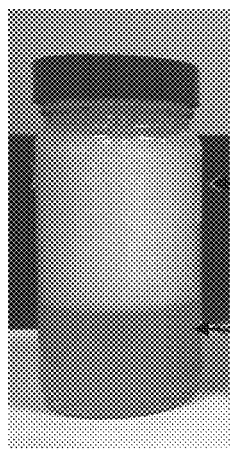
FIGS. 4A-D depict various combinations of the immiscible fluid systems of the disclosure.
Figure 4B:
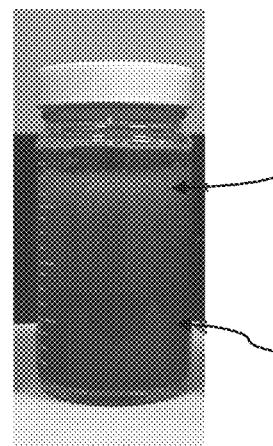
Figure 4C:
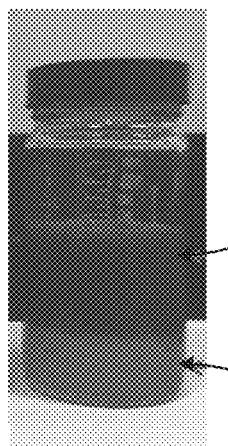
Figure 4D:
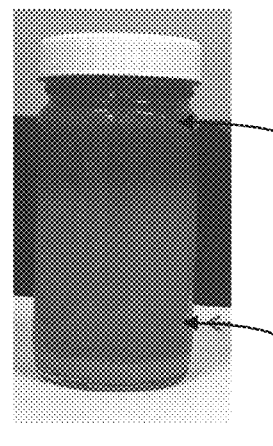

After generally preparing the immiscible fluid system as described above, variations of the fluid system were placed in jars and allowed to settle. FIG. 4A demonstrates an immiscible fluid system comprising an aqueous-based linear guar gel 402 and oil based My-T-Oil™ crosslinked gel 401. If the fluid system is prepared with a non-coated microproppant 404, FIG. 4B demonstrates that the non-coated microproppant 404 failed to remain suspended in immiscible fluid system, and is particularly absent from the My-T-Oil™ crosslinked gel 403. As seen in FIG. 4C, the immiscible fluid system with FinesWedge™ System coated microproppant suspended in My-T-Oil™ gel 405, the microproppant remained in the upper oil based fluid due to its hydrophobic surface modification, leaving the linear guar gel 406 virtually empty. In addition, microproppant settling was not observed due highly viscous nature of the crosslinked fluid. As illustrated in FIG. 4D, When SSA-2™ (sand) was added to the mixture, it settled to the bottom in aqueous-based linear guar gel 408 due to its higher density, leaving the coated microproppant in the upper oil based fluid 407. One of skill in the art may conclude that the hydrophobic surface coating of microproppants plays an important role in keeping the particulates in the upper oil phase.

Embodiments disclosed herein include:

A: A method of treating in a subterranean formation comprising: combining an aqueous base fluid, an oil based fluid, a hydrophobic proppant, and a non-hydrophobic proppant to form an immiscible fluid system; and introducing the immiscible fluid system into the subterranean formation.

B: A method of treating in a subterranean formation comprising: a) combining an aqueous base fluid, an oil based fluid, a hydrophobic proppant, and a non-hydrophobic proppant to form an immiscible fluid system; b) introducing the immiscible fluid system into a portion of the at least one fracture in the formation; c) allowing the oil based fluid and hydrophobic proppant to form proppant aggregates, and the aqueous based fluid to act as a spacer fluid surrounding at least a portion of the proppant aggregates; d) repeating any sequence of b) and c) until a desired amount of proppant aggregates have been formed in the fracture; and e) removing the spacer fluid from the fracture during flowback stage or well production to form proppant-free channels between proppant aggregates.

C: A method of treating in a subterranean formation comprising: combining a non-aqueous carrier fluid; a nanoparticle slurry including a microparticle suspension comprising a first proppant; an aqueous base fluid; and a second proppant; to form an immiscible fluid system, wherein the first proppant is hydrophobic and the second proppant is non-hydrophobic, and the nanoparticle slurry comprises at least one of polymer particles, surfactants, clay, metal oxides, graphene, and combinations thereof acting as suspension agents; and introducing the immiscible fluid system into the subterranean formation.

D: A well treatment system comprising: a well treatment apparatus, including a mixer and a pump, configured to: combine an aqueous base fluid, an oil based fluid, a hydrophobic proppant, and a non-hydrophobic proppant to form an immiscible fluid system; and introduce the immiscible fluid system into a subterranean formation.

Each of embodiments A, B, C and D may have one or more of the following additional elements in any combination: Element 1: wherein the aqueous base fluid comprises at least one fluid selected from aqueous linear gel, aqueous linear polysaccharide gel, crosslinked aqueous base fluid, slick water, water, brine, viscoelastic surfactant solution, and combinations thereof. Element 2: wherein the aqueous base fluid comprises aqueous linear guar gel. Element 3: wherein the oil based fluid comprises at least one fluid selected from crosslinked oil based gel, non-crosslinked oil based gel, oil based surfactant gel, crosslinked anionic surfactant oil based gel, food-grade oils, and combinations thereof. Element 4: wherein the oil based fluid comprises crosslinked anionic surfactant oil based gel. Element 5: wherein the hydrophobic proppant comprises at least one selected from a hydrophobically modified proppant, an inherently hydrophobic proppant, a proppant with a hydrophobic coating, and combinations thereof. Element 6: wherein the hydrophobically modified proppant includes at least one of a hydrophobically modified amine-containing polymer (HMAP), a silane composition, and combinations thereof, the HMAP comprising a plurality of hydrophobic modifications on an amine-containing polymer, wherein the amine-containing polymer comprises at least one selected from the group consisting of a polyamine, a polyimine, a polyamide, poly(2-(N, N-dimethylamino)ethyl methacrylate), poly(2-(N,N-diethylamino) ethyl methacrylate), poly(vinyl imidazole), any copolymer thereof, and any combination thereof; and wherein the hydrophobic modification comprises a C4-C30 characterized by at least one selected from the group consisting of a straight chain, a branched chain, comprising an unsaturated C—C bond, comprising an aryl group, and any combination thereof. Element 7: wherein the silane composition is selected from the group consisting of 1,8 bis(triethoxy silyl octane), octadecyltrichlorosilane, butyldimethylchlorosilane, heptadecafluorodecyltrimethoxysilane, 1,2-bis(triethoxysilyl)ethane, hexaethoxydisilethylene, bis(trimethoxysilylethyl) benzene, 1,2-bis(trimethoxysilyl)decane, and combinations thereof. Element 8: wherein the non-hydrophobic proppants are at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Element 9: wherein the subterranean formation comprises at least one fracture and wherein the introducing further comprises placing at least a portion of the immiscible fluid system into the at least one fracture. Element 10: further comprising adding a consolidating agent to the immiscible fluid system at a time of at least one of before the introducing of the immiscible fluid system into the subterranean formation, during the introducing of the fluid system, after the introducing the fluid system, and combinations thereof. Element 11: wherein the oil based fluid with the hydrophobic proppant, and the aqueous base fluid with the non-hydrophobic proppant are introduced into the formation as at least one of an emulsion, distinct phases, and combinations thereof. Element 12: wherein the hydrophobic proppant comprises a proppant that has been at least one of hydrophobically modified, hydrophobically coated, and combinations thereof. Element 13: wherein the first proppant is of the same composition as the second proppant except for the addition of at least one of a hydrophobic coating, a hydrophobic surface modification, and combinations thereof to the first proppant. Element 14: further comprising a mixer for combining the immiscible fluid system and a pump for introducing the immiscible fluid system into the subterranean formation.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of treating in a subterranean formation comprising at least one fracture comprising:
   combining:
   an aqueous based fluid, wherein the aqueous base fluid comprises aqueous linear guar gel,
   an oil based fluid, wherein the oil based fluid comprises at least one fluid selected from crosslinked oil based gel, non-crosslinked oil based gel, oil based surfactant gel, an anionic gel that is crosslinked, food-grade oils, and combinations thereof, a hydrophobic proppant comprising sand and a hydrophobically modified amine-containing polymer, the hydrophobically modified amine-containing polymer being selected from the group consisting of a polyamine, a polyimine, a polyamide, poly(2-(N,N-dimethylamino)ethyl methacrylate), poly(2-(N,N-diethylamino)ethyl methacrylate), poly(vinyl imidazole), and any combinations thereof;

wherein the hydrophobically modified amine-containing polymer is modified by a $C_4$-$C_{30}$ moiety, and a non-hydrophobic proppant to form an immiscible fluid system, wherein the hydrophobic proppant is present in the oil based fluid and the non-hydrophobic proppant is present in the aqueous based fluid; and introducing the immiscible fluid system into a fracture in the subterranean formation, wherein the immiscible fluid system separates into an oil phase containing the hydrophobic proppant and an aqueous phase containing the non-hydrophobic proppant after the step of introducing the immiscible fluid system into the fracture, and wherein the oil phase is positioned on top of the aqueous phase, wherein the introducing comprises placing at least a portion of the immiscible fluid system into the at least one fracture, and further comprising adding a consolidating agent to the immiscible fluid system at a time of before the introducing of the immiscible fluid system into the subterranean formation, during the introducing of the fluid system, after the introducing the fluid system, and combinations thereof.

2. The method of claim 1, wherein the aqueous base fluid comprises at least one fluid selected from aqueous linear gel, aqueous linear polysaccharide gel, crosslinked aqueous base fluid, slick water, water, brine, viscoelastic surfactant solution, and combinations thereof.

3. The method of claim 1, wherein the oil based fluid comprises the anionic gel that is crosslinked.

4. The method of claim 1, wherein the hydrophobic proppant further comprises at least one selected from a hydrophobically modified proppant, a proppant with a hydrophobic coating, for both.

5. The method of claim 1, wherein the $C_4$-$C_{30}$ moiety comprises a straight chain or a branched chain moiety, wherein the branched chain moiety comprises an aryl group.

6. The method of claim 1, wherein the non-hydrophobic proppant is selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof.

7. The method of claim 1, wherein the hydrophobic proppant comprises a proppant that has been hydrophobically modified, hydrophobically coated, or both.

8. The method of claim 1, further comprising:
removing a portion of the oil phase and the aqueous phase from the fracture during a flowback stage or a well production to form proppant-free channels between the hydrophobic proppant aggregates and between proppant aggregates.

9. The method of claim 1, further comprising a mixer for combining the immiscible fluid system and a pump for introducing the immiscible fluid system into the subterranean formation.

10. The method of claim 1, wherein the oil based fluid comprises an oil selected from the group consisting of vegetable oil, corn oil, canola oil, and combinations thereof.

* * * * *